United States Patent
Hancock

(10) Patent No.: US 10,479,479 B2
(45) Date of Patent: Nov. 19, 2019

(54) FOLDING WING TIP AND BIASED LOCKING DEVICE

(71) Applicant: AIRBUS OPERATIONS LIMITED, Bristol (GB)

(72) Inventor: Nick Hancock, Gloucester (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 226 days.

(21) Appl. No.: 15/152,714

(22) Filed: May 12, 2016

(65) Prior Publication Data

US 2016/0332721 A1    Nov. 17, 2016

(30) Foreign Application Priority Data

May 15, 2015 (GB) .................................. 1508426.2

(51) Int. Cl.
*B64C 3/56* (2006.01)
*B64C 23/06* (2006.01)

(52) U.S. Cl.
CPC .............. *B64C 3/56* (2013.01); *B64C 23/072* (2017.05); *Y02T 50/164* (2013.01)

(58) Field of Classification Search
CPC ........ B64C 3/56; B64C 23/072; Y02T 50/164
See application file for complete search history.

(56) References Cited

U.S. PATENT DOCUMENTS

| | | | | |
|---|---|---|---|---|
| 2,280,809 A | * | 4/1942 | Evans | ........................ B64C 3/56 116/285 |
| 5,201,479 A | | 4/1993 | Renzelmann | |
| 5,350,135 A | * | 9/1994 | Renzelmann | ............. B64C 3/56 244/49 |

(Continued)

FOREIGN PATENT DOCUMENTS

| | | |
|---|---|---|
| EP | 2674356 A2 | 12/2013 |
| EP | 2730500 A2 | 5/2014 |

OTHER PUBLICATIONS

Search Report dated Nov. 12, 2015 in Great Britain Application No. GB1508426.2.

(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

The invention provides an aircraft comprising an aircraft wing. The aircraft wing comprises a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the flight configuration such that the span of the aircraft wing is reduced. The aircraft wing further comprises a locking mechanism for locking the folding wing tip device in the flight configuration. The locking mechanism comprises a locking hook associated with one of the folding wing tip device and the fixed wing, and a locking pin associated with the other of the folding wing tip device and the fixed wing, and a biasing device, wherein in the locked configuration the locking pin is engaged with the locking hook and the biasing device acts to preload the locking mechanism.

13 Claims, 6 Drawing Sheets

(56) References Cited

U.S. PATENT DOCUMENTS

| | | | | |
|---|---|---|---|---|
| 5,379,969 | A * | 1/1995 | Marx | B64C 3/56 244/49 |
| 8,946,607 | B2 * | 2/2015 | Gettinger | B64C 39/024 244/3.27 |
| 9,469,392 | B2 * | 10/2016 | Fox | B64C 23/072 |
| 9,481,446 | B2 * | 11/2016 | Lassen | B64C 3/56 |
| 9,517,834 | B2 * | 12/2016 | Thompson | B64C 3/56 |
| 9,580,166 | B2 * | 2/2017 | Good | B64C 3/56 |
| 9,783,284 | B2 * | 10/2017 | Townsend | B64C 3/56 |
| 2013/0327883 | A1 | 12/2013 | Kordel et al. | |
| 2015/0298793 | A1 | 10/2015 | Fox et al. | |

OTHER PUBLICATIONS

Search Report dated Oct. 10, 2016 in European Application No. EP 16169546.5.

* cited by examiner

FOLDING WING TIP AND BIASED LOCKING DEVICE

RELATED APPLICATIONS

The present application claims priority from Great Britain Application Number 1508426.2, filed May 15, 2015, the disclosure of which is hereby incorporated by reference herein in its entirety.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

In order to securely fasten the folding wing tip device in the flight configuration, one or more locking mechanisms must be used. However, conventional locking mechanisms may not provide the secure fastening required for a folding wing tip. In particular, wear in a locking mechanism may result in there being play between the wing tip device and the fixed wing of the aircraft when in the flight configuration. Play may add to wear in the connection between the wing tip device and the fixed wing. Alternatively or additionally, play in the wing tip device may result in vibrations travelling down the fixed wing to the aircraft fuselage.

The present invention seeks to mitigate the above-mentioned problems. Alternatively or additionally, the present invention seeks to provide an improved wing tip device and locking mechanism.

SUMMARY OF THE INVENTION

The present invention provides, according to a first aspect, an aircraft comprising an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the flight configuration such that the span of the aircraft wing is reduced, the aircraft wing further comprising a locking mechanism for locking the folding wing tip device in the locked flight configuration, the locking mechanism comprising a locking hook associated with one of the folding wing tip device and the fixed wing, and a locking pin associated with the other of the folding wing tip device and the fixed wing, and a biasing device, wherein in the locked configuration the locking hook is engaged with the locking pin and the biasing device acts to preload the locking mechanism.

The biasing device acts to preload the locking mechanism, such that any wear of the locking hook and the locking pin is compensated for, without play being introduced into the locking mechanism.

The biasing device may be a spring, for example a helical coil spring, a wave spring, or a conical disk spring. The biasing device may be a pneumatic or hydraulic device.

The biasing device may be associated with the locking pin. The biasing device may comprise a first biasing member at one end of the locking pin and a second biasing member at the opposite end of the locking pin.

The biasing device may be associated with the locking hook.

The locking hook may be associated with the fixed wing. The locking pin may be associated with the wing tip device.

In an alternative arrangement, the locking hook may be associated with the wing tip device and the locking pin may be associated with the fixed wing.

The locking hook may be hydraulically or pneumatically actuated into and out of engagement with the locking pin.

The biasing device may be configured such that if the wing tip device experiences a threshold load in the flight configuration, the biasing device allows at least a limited deflection of the wing tip device. This deflection may absorb the excess load, preventing the load from being transferred to the fixed wing or fuselage of an aircraft to which the wing is attached. The biasing device may act to restore the wing tip device to the usual locked position once the excess load is removed.

The wing tip device is configurable between: (i) a locked flight configuration for use during flight and (ii) a ground configuration for use during ground-based operations, in which ground configuration the wing tip device is moved away from the flight configuration such that the span of the aircraft wing is reduced. In the ground configuration the locking mechanism is in an unlocked configuration, where the locking hook and the locking pin are not engaged with each other.

The wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of a fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a second aspect of the invention, there is provided an aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the flight configuration such that the span of the aircraft wing is reduced, the aircraft wing further comprising a locking mechanism for locking the folding wing tip device in the locked flight configuration, the locking mechanism comprising a locking hook associated with one of the folding wing tip device and the fixed wing, and a locking pin associated with the other of the folding wing tip device and the fixed wing, and a biasing device, wherein in the locked configuration the locking hook is engaged with the locking pin and the biasing device acts to preload the locking mechanism.

According to a third aspect of the invention, there is provided a method of locking a wing tip device into a locked flight configuration on an aircraft as described above, the method comprising the steps of: moving the wing tip device into the flight configuration and actuating the locking hook to engage with the locking pin, such that the biasing device acts to preload the locking mechanism.

According to a fourth aspect of the invention, there is provided a method of unlocking a wing tip device on an aircraft as described above, the wing tip device in a locked flight configuration, the method comprising the steps of: actuating the locking hook to disengage with the locking pin.

According to a fifth aspect of the invention, there is provided a locking mechanism with a locked configuration and unlocked configuration, the locking mechanism comprising a locking hook, a locking pin, and a biasing device, wherein in the locked configuration the locking hook is engaged with the locking pin and the biasing device acts to preload the locking mechanism.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
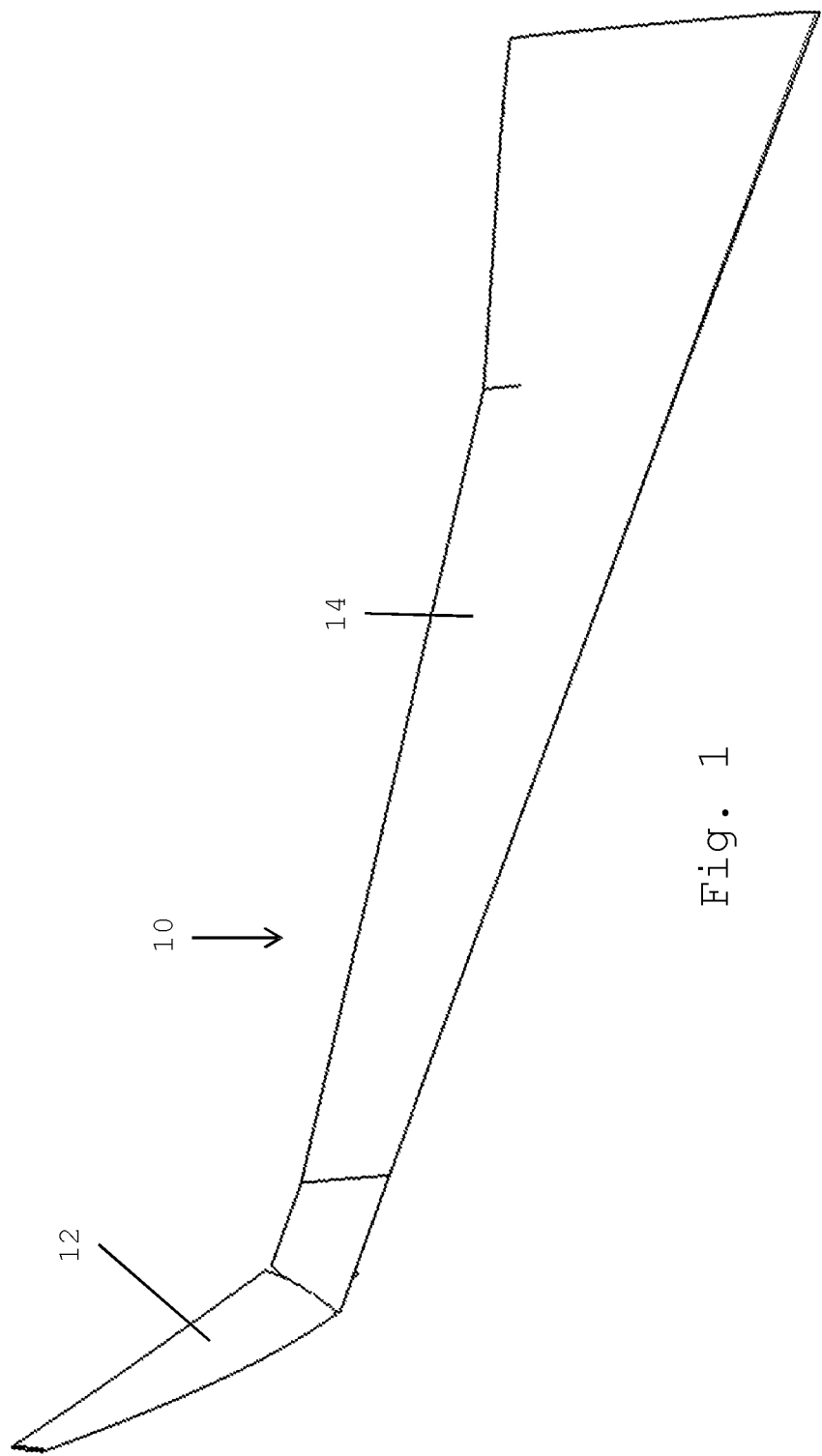
FIG. 1 shows an aircraft wing according to a first embodiment of the invention.

FIG. 1 shows an aircraft wing 10, comprising a folding wing tip device 12 and a fixed wing 14. The folding wing tip device 12 is connected to the outer edge of the fixed wing 14 by a hinge (not shown), and is movable between a flight configuration in which the wing tip device 12 is extended and increases the span of the wing 10, and a ground configuration, where the wing tip device 12 is moved away from the flight configuration and the span of the wing 10 is reduced. The wing 10 is shown in the ground configuration in FIG. 1.

Figure 2:
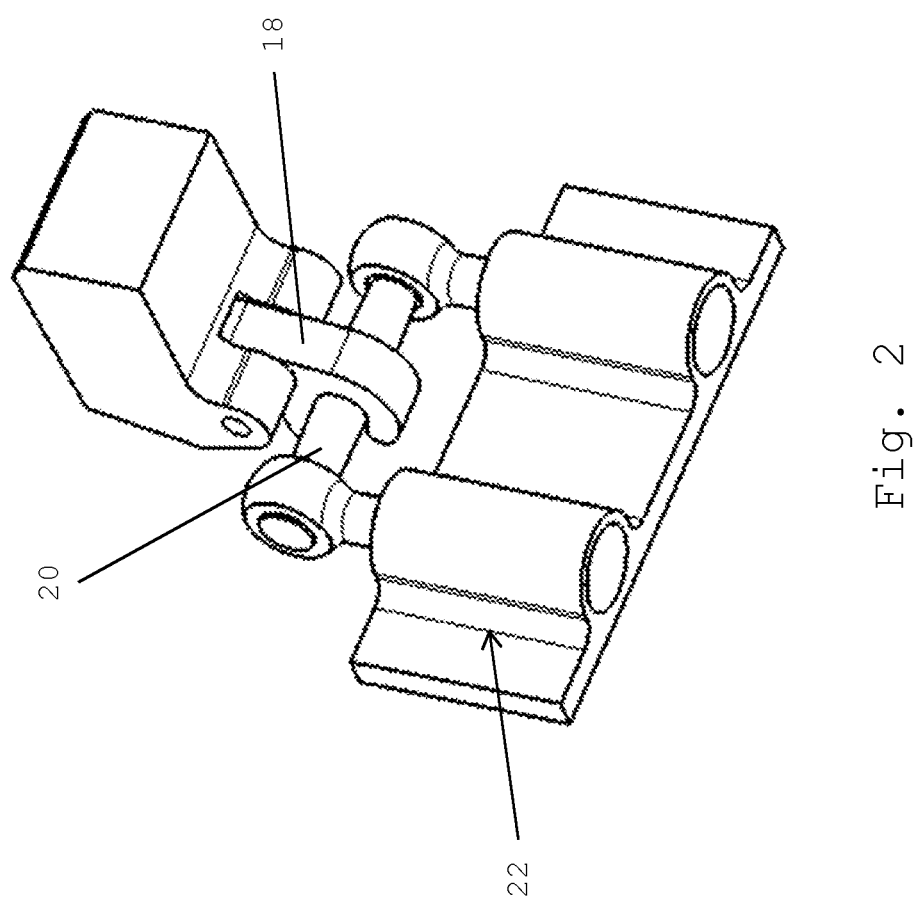
FIG. 2 shows a locking mechanism according to the first embodiment of the invention.
Figure 3:
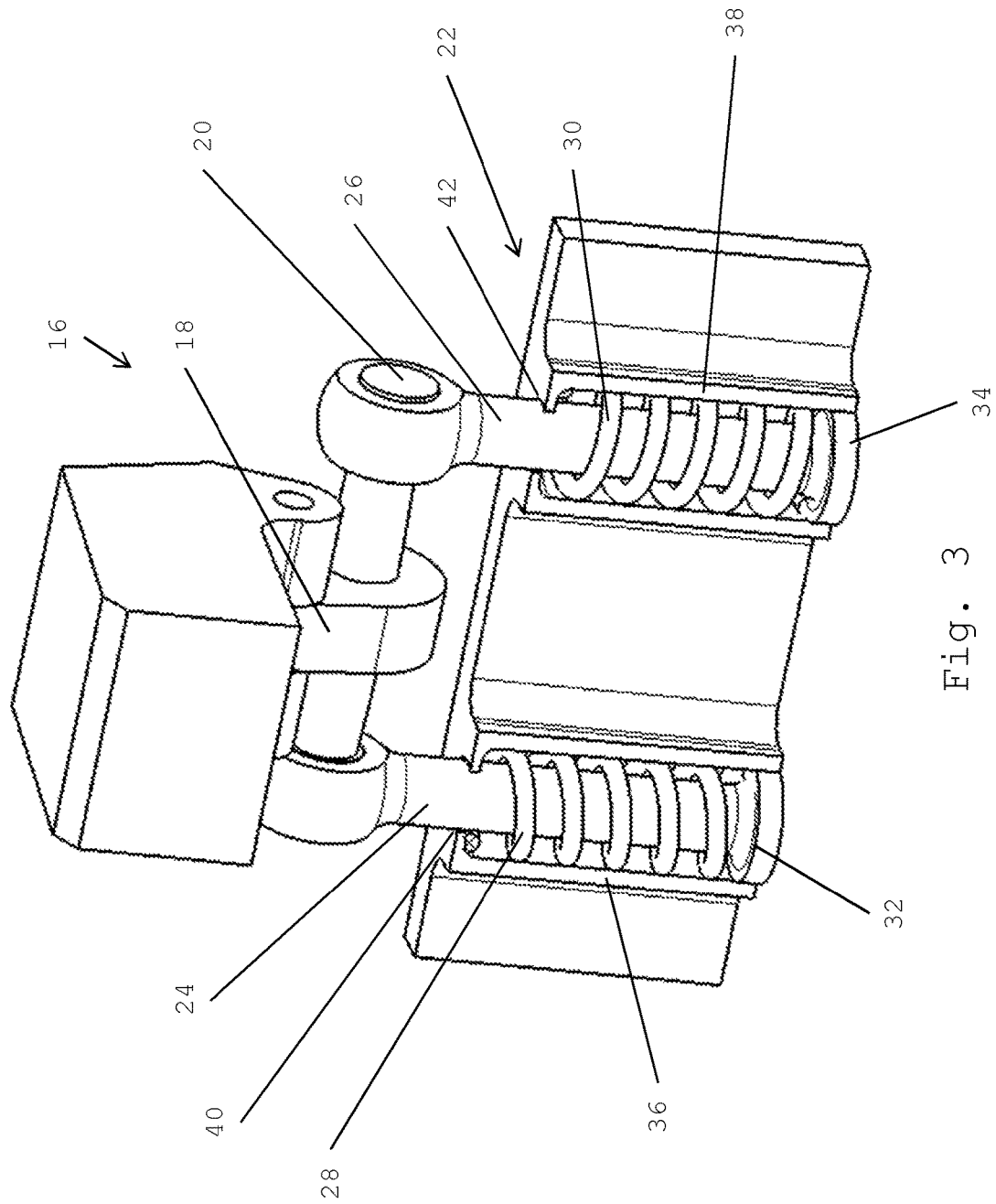
FIG. 3 shows a partial cross section of the locking mechanism according to the first embodiment of the invention.

FIGS. 2 and 3 show the locking mechanism 16 comprising a locking hook 18, a locking pin 20, and a biasing device 22 associated with the locking pin 20. The biasing device 22 comprises a first support arm 24 and a second support arm 26 connected at each longitudinal end of the locking pin 20. Each support arm 24, 26, is associated with a helical spring 28, 30. The end of each support arm away from the locking pin includes an expanded stop 32, 34, engaged with one end of the springs 28, 30. The support arms 22, 24, and springs 28, 30, are movably located in receiving portions 36, 38, which include a further spring stop 40, 42, away from the expanded stops 32, 34, which engages with the other end of the springs 28, 30. The support arms 24, 26, may move up and down within the receiving portions 32, 34. When in the locked position as shown in FIGS. 2 and 3, the locking hook 18 pulls on the locking pin 20, effectively raising the locking pin from the unlocked position and moving the support arms 22, 24 within the receiving portions 36, 38, such that the springs 28, 30 are compressed. The springs 28, 30, being under compression, act to bias the locking pin 20 away from the locking hook 18, thereby pre-loading the locking mechanism 16. The pre-loading compensates for potential wear of the locking hook 18 and the locking pin 20, such that the locking mechanism remains securely locked with no play being introduced to the coupling.

Figure 4:
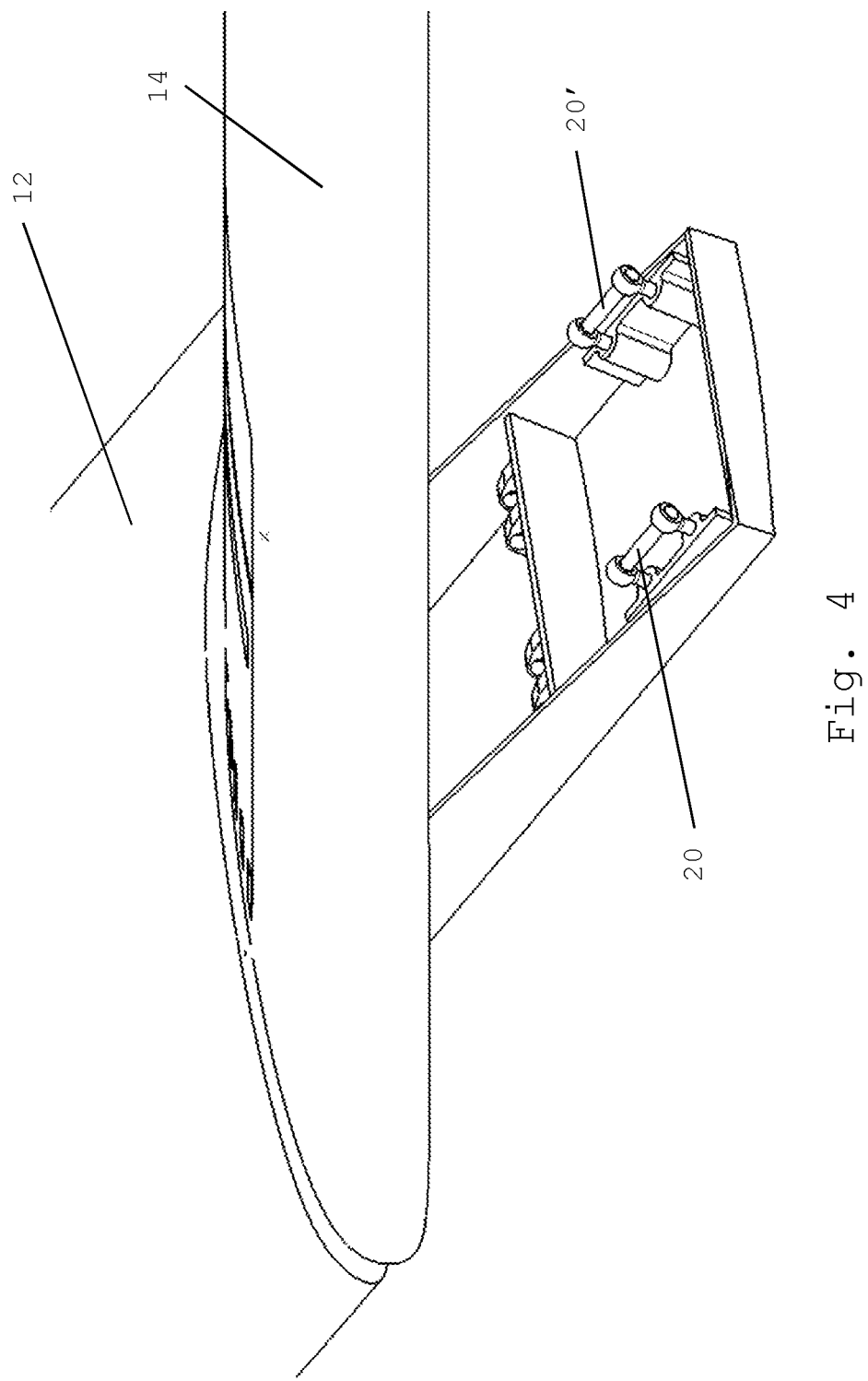
FIG. 4 shows an aircraft wing according to a second embodiment of the invention, with the wing in an unlocked position.

FIG. 4 shows how the wing tip 12 may comprise two locking pins 20, 20', located on the forward and aft spars of the wing tip device 12. Corresponding locking hooks are located on the fixed wing 14, such that when the wing tip device is in the flight configuration, the locking pins 20, 20', engage with their respective locking hooks. It can be seen in FIG. 4 that the locking mechanism is displaced inboard compared to the hinge between the wing tip device 12 and the fixed wing 14, with an extended portion of the wing tip device 12 overlapping part of the fixed wing 14. Only two locking mechanisms are shown in FIG. 4, but the skilled person will appreciate that there may be any number of locking mechanisms. Increasing the number of locking mechanisms may increase the security and strength of the wing tip device 12 when in the flight configuration. The plurality of locking mechanisms may be oriented in different ways in order to improve the load handling of the wing tip device 12 and fixed wing 14 when in the flight configuration.

In order to move from the ground configuration to the flight configuration, the wing tip device is actuated by an actuator (not shown) to move from the folded, reduced span, position, to the flight configuration where the span of the wing is increased in comparison. The wing tip device 12 rotates around the hinge with the fixed wing 14, and the locking pin 20 is moved towards the locking hook 18. The locking hook 18 has an unlocked position, in which the locking hook is rotated to allow the locking pin 20 into and out of the curved inner section of the locking hook 18, and a locked position, when the locking hook 18 is engaged with the locking pin 20 and blocks the removal of the locking pin 20 from the locking hook 18.

Figure 5:
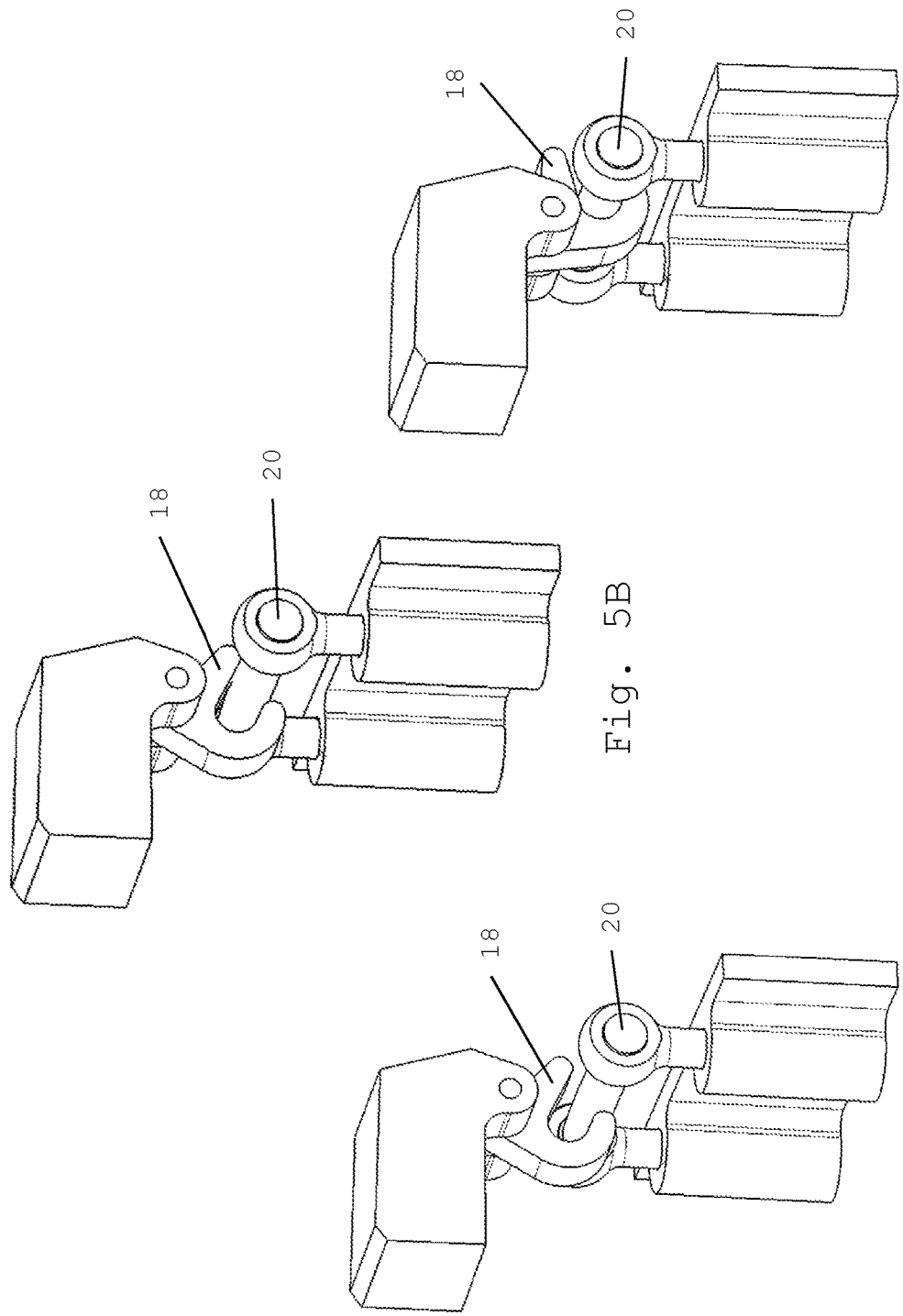
FIGS. 5A, 5B, and 5C show an aircraft wing according to a third embodiment of the invention moving from an unlocked to a locked position.

FIGS. 5A, 5B, and 5C, show the movement of the locking pin 16 towards the locking hook 18 and engaging with the locking hook 18. As the locking hook 18 is rotated to the locked position, the shape of the inner portion of the hook acts to pull the locking pin 20 upwards, thereby effectively raising the locking pin from the unlocked position and compressing the springs 24, 26, against the spring stops 40, 42, and pre-loading the locking mechanism. To unlock the locking device, the locking hook 18 is rotated to allow the locking pin 20 to move out of engagement with and away from the locking hook 18 in a reverse of the locking process.

Figure 6:
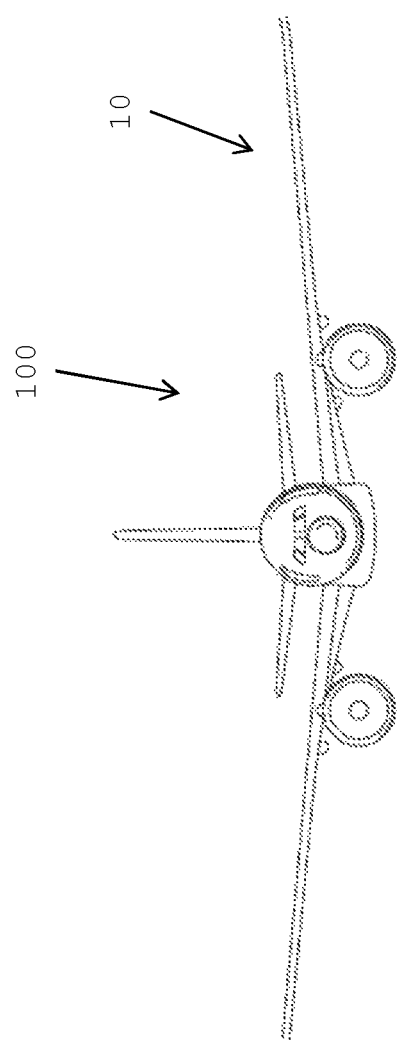
FIG. 6 shows an aircraft according to a fourth embodiment of the invention.

FIG. 6 shows an aircraft, the aircraft 100 comprising an aircraft wing 10 substantially as described with reference to FIGS. 1 to 5. The wing tip device 12 is shown in the locked flight configuration in FIG. 6.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the embodiment described with reference to FIGS. 1 to 4, the locking pin is associated with the wing tip device, and the locking hook is associated with the fixed wing. However, the skilled person will appreciate this arrangement could be reversed such that the locking pin is associated with the fixed wing, and the locking hook is associated with the wing tip device.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising an aircraft wing, the aircraft wing comprising:
   a fixed wing and a wing tip device at the tip thereof, wherein the wing tip device is configurable between:
   (i) a locked flight configuration for use during flight and
   (ii) a ground configuration for use during ground-based operations, in which ground configuration the wing tip device is moved away from the flight configuration such that the span of the aircraft wing is reduced,
   the aircraft wing comprising a locking mechanism for locking the folding wing tip device in the locked flight configuration,
   the locking mechanism comprising a locking hook associated with one of the folding wing tip device and the fixed wing, and
   a locking pin associated with the other of the folding wing tip device and the fixed wing, and
   a first biasing device at one end of the locking pin and a second biasing device at the opposite end of the locking pin,
   wherein in the locked configuration the locking hook is engaged with the locking pin and the first and second biasing devices act to preload the locking mechanism.

2. An aircraft as claimed in claim 1, wherein the first and second biasing devices are springs.

3. An aircraft as claimed in claim 1, wherein the first and second biasing devices are pneumatic or hydraulic devices.

4. An aircraft as claimed in claim 1, wherein the biasing device is associated with the locking hook.

5. An aircraft as claimed in claim 1, wherein the locking hook is associated with the fixed wing.

6. An aircraft as claimed in claim 1, wherein the locking pin is associated with the wing tip device.

7. An aircraft as claimed in claim 1, wherein the locking hook is associated with the wing tip device.

8. An aircraft wing as claimed in claim 1, wherein the locking pin is associated with the fixed wing.

9. An aircraft as claimed in claim 1, wherein the locking hook is hydraulically or pneumatically actuated into and out of engagement with the locking pin.

10. An aircraft as claimed in claim 1, wherein the biasing device is configured such that if the wing tip device experiences a threshold load in the flight configuration, the biasing device allows at least a limited deflection of the wing tip device.

11. An aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the flight configuration such that the span of the aircraft wing is reduced, the aircraft wing comprising a locking mechanism for locking the folding wing tip device in the locked flight configuration, the locking mechanism comprising a locking hook associated with one of the folding wing tip device and the fixed wing, and a locking pin associated with the other of the folding wing tip device and the fixed wing, and a first spring biasing device at one end of the locking pin and a second spring biasing device at the opposite end of the locking pin, wherein in the locked configuration the locking hook is engaged with the locking pin and the first and second biasing devices springs act to preload the locking mechanism.

12. A method of locking a wing tip device into a locked flight configuration on an aircraft having a fixed wing and a wing tip device at the tip thereof, the aircraft wing comprising a locking mechanism for locking the folding wing tip device in the locked flight configuration, the locking mechanism comprising a locking hook associated with one of the folding wing tip device and the fixed wing, and a locking pin associated with the other of the folding wing tip device and the fixed wing, and a first spring biasing device at one end of the locking pin and a second spring biasing device at the opposite end of the locking pin, the method comprising the steps of: moving the wing tip device into the flight configuration and actuating the locking hook to engage with the locking pin, such that the first and second spring biasing devices act to preload the locking mechanism.

13. A method of unlocking a wing tip device on an aircraft as claimed in claim 12, the method further comprising the steps of: actuating the locking hook to disengage with the locking pin.

* * * * *